No. 831,993. PATENTED SEPT. 25, 1906.
D. REDDIN.
FARM GATE.
APPLICATION FILED JAN. 12, 1906.
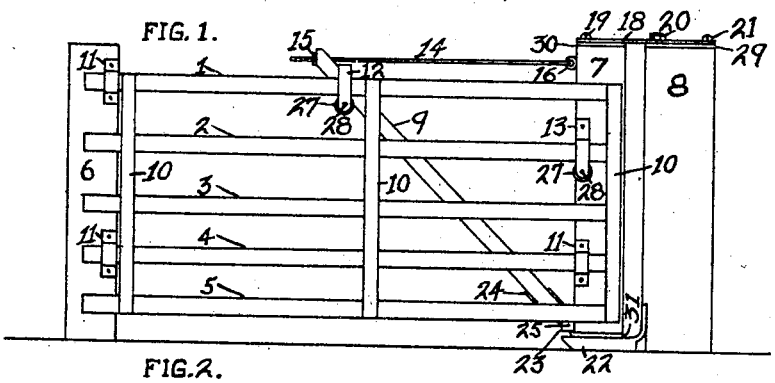
FIG. 1.
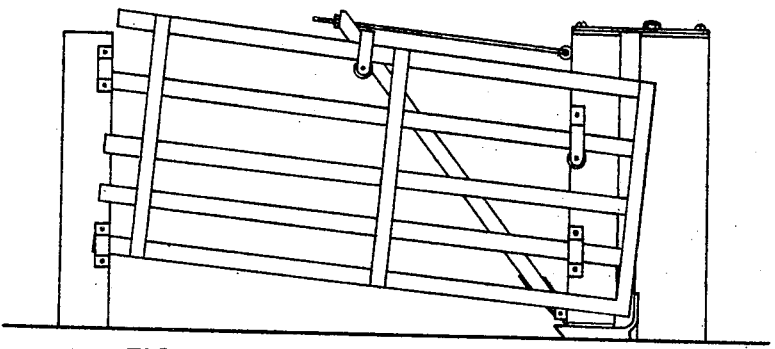
FIG. 2.
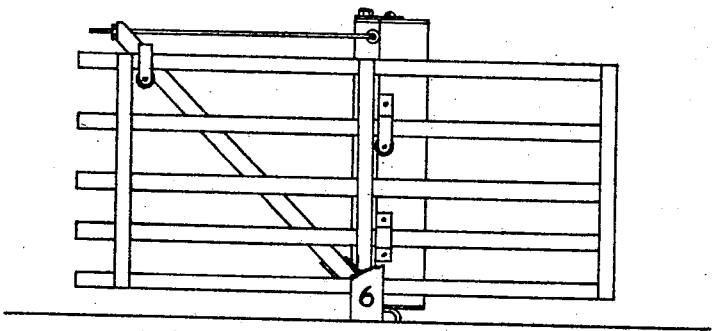
FIG. 3.
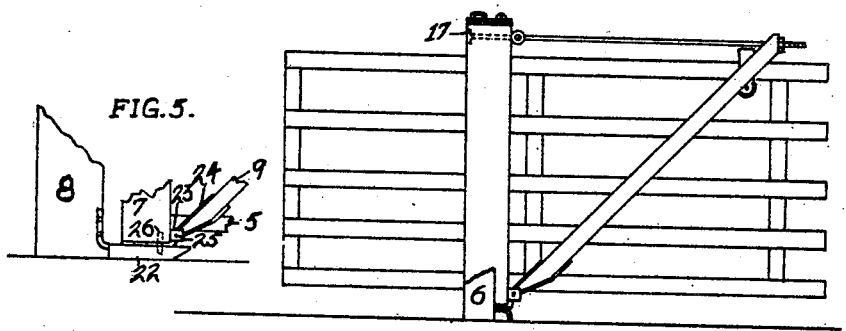
FIG. 4.
FIG. 5.
Witnesses.
Columbus F. Davis
W. E. Draper
Inventor.
David Reddin
per Samuel A. Wray
Attorney.

UNITED STATES PATENT OFFICE.

DAVID REDDIN, OF GREENFIELD, INDIANA.

FARM-GATE.

No. 831,993.   Specification of Letters Patent.   Patented Sept. 25, 1906.

Application filed January 12, 1906. Serial No. 295,829.

*To all whom it may concern:*

Be it known that I, DAVID REDDIN, a citizen of the United States, residing at the city of Greenfield, in the county of Hancock, in the State of Indiana, have invented certain new and useful Improvements in Farm-Gates; and I do hereby declare that the following is a full, clear, and exact description of the invention, which will enable others skilled in the art to which it appertains to make and use the same, reference being had to the accompanying drawings, which form part of this specification.

This invention relates to improvements in farm-gates.

The object of the invention is to provide a cheap, simple, and substantial gate of the character mentioned and one which is especially adapted for use in interior fences for the separation of stock, but also designed for other ordinary farm purposes.

My several drawings illustrate the several positions and uses to which this gate can be put and also its mode of construction.

Figure 1 is a side view of the gate when closed, showing all of its several parts. Fig. 2 is a side view of the gate, showing the end raised so as to permit small stock, such as hogs and sheep, to pass under, and at the same time prevent large stock, such as cattle and horses, from passing through. Fig. 3 is a view of the gate wide open to the left and pushed back half-way. Fig. 4 is also a view of the gate wide open to the right and pushed back half-way between the pivotal post and the regular gate-post, thus preventing it from coming shut. Fig. 5 is a detail view showing the lower end of the gate at its pivotal point of connection with the post.

Similar letters refer to similar parts throughout the several views.

In the accompanying drawings, Fig. 1 represents all the several parts of the gate and are as follows:

1, 2, 3, 4, and 5 is a series of gate-bars, that may vary in size or number, as desired.

6 and 8 are the gate-posts and may be of any size desired.

7 is the pivotal post on which the gate is hung and is a piece of timber of such length that the lower end rests on shoe or lower hinge and reaches to the top of the regular gate-post.

9, the brace, is a piece of timber of sufficient size to support the gate and of such length that it passes from the lower hinge end of the pivotal post in a diagonal manner to the center of the gate on top. It is attached to the lower end of the pivotal post by means of a hinge, and at the upper end there is a hole through which the tension-rod passes and serves as a brace for the gate, and its purpose is to support the gate.

10 represents the slats at end and midway of the gate to hold the gate together and are attached in the usual way.

11 represents the staples attached to the posts by means of bolts or otherwise and are of sufficient size to permit the bars of the gate to pass through, so as to hold it in place.

12 is a clevis or support made of iron in a U shape, that is attached to the brace at the upper end and passes down over and on each side of the top bar of the gate and supports the top pulley on which the gate rolls.

13 is a hasp made of iron, one end of which is attached to the pivotal post and passes from there over and down the side of the second bar of the gate and supports the lower pulley on which the gate rolls.

14 is a tension-rod, of iron, one end of which is bent back on itself and forms an eye. On the other end a thread is cut, on which the tap or nut 15 is screwed, and it is of such length as to reach from the pivotal post to and pass through the top end of the brace 9.

16 is a piece of iron of the same dimensions as the tension-rod, with one end bent round on itself, forming an eye, into which the eye in the tension-rod is fastened. On the other end a thread is cut on which the nut 17 is screwed, and it is of sufficient length to pass through the pivotal post.

17 is the nut screwed on loose end of the tension-rod.

The top hinge is a piece of iron 18, pivoted to post 7 at 19 and having at its other end a slot, through which it is adjustably secured to the post 8 by set-screw 20, so that post 7 may be made to stand plumb.

A shoe 22 is secured to the base of the post 8 and is provided with a pintle or pin 26, upon which the post 7 is pivoted. This pin is mounted upon the shoe at the proper distance from the foot of the stationary post, so that the gate may readily pass between said post and the pivotal post. Lugs or ears 23 are mounted at the lower end of the pivotal post, and a strap 24, carried on the end of the brace 9, is pivoted between the ears by means of the pintle-bolt 25.

27 represents the pulleys on which the gate rolls and is of metal and may be any size desired.

28 represents the bolts that hold the pulleys in place.

29, 30, and 31 are wear-plates on the posts.

Having thus described my invention, what I desire to secure by Letters Patent is—

1. The combination in a gate, of a stationary post, a post pivotally connected therewith, a brace pivoted between ears at the foot of the pivotal post, means for adjustably supporting said brace, and a gate supported by said brace and pivotal post.

2. In a gate, the combination with a stationary post, a pivotal post, of a brace pivoted to said pivotal post having its end extending above the gate, means for supporting the upper end of the brace consisting of a supporting-rod pivoted to the post having its outer threaded end adjustably secured to the extended end of the brace, and a gate supported by the pivotal post and brace.

3. In a gate, the combination with a stationary post, a post pivoted thereto, a brace pivoted to the foot of the pivotal post having its upper end extending above the top of the gate, a supporting-rod pivoted to the post and having its end adjustably secured in the extended end of the brace, a gate slidably supported by the pivotal post and brace, the outer end of the gate adapted to be raised with the foot of the brace as a fulcrum.

DAVID REDDIN.

Witnesses:
 COLUMBUS DAVIS,
 W. O. SAYERS.